(12) United States Patent
Gover et al.

(10) Patent No.: US 6,708,296 B1
(45) Date of Patent: Mar. 16, 2004

(54) METHOD AND SYSTEM FOR SELECTING AND DISTINGUISHING AN EVENT SEQUENCE USING AN EFFECTIVE ADDRESS IN A PROCESSING SYSTEM

(75) Inventors: Frank Carl Gover, Round Rock, TX (US); Frank Eliot Levine, Austin, TX (US); Bret R. Olszewski, Austin, TX (US); Charles Philip Roth, Austin, TX (US); Edward Hugh Welbon, Austin, TX (US); Charles Wright, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1,736 days.

(21) Appl. No.: 08/538,071

(22) Filed: Oct. 2, 1995

Related U.S. Application Data

(63) Continuation-in-part of application No. 08/497,242, filed on Jun. 30, 1995, now Pat. No. 5,875,294.

(51) Int. Cl.$^7$ ............................................. G06F 13/00
(52) U.S. Cl. ..................................... 714/47; 395/184.01
(58) Field of Search .......................... 395/184.01, 183.13, 395/183.14, 183.21

(56) References Cited

U.S. PATENT DOCUMENTS

| | | | |
|---|---|---|---|
| 3,702,005 A | 10/1972 | Ingalls, Jr. ..................... 444/1 |
| 3,707,725 A | 12/1972 | Dellheim ....................... 444/1 |
| 3,728,692 A | 4/1973 | Fennel, Jr. ............... 340/172.5 |
| 3,771,144 A | 11/1973 | Belady et al. ........... 340/172.5 |
| 3,818,458 A | 6/1974 | Deese ..................... 340/172.5 |
| 3,828,324 A | 8/1974 | Vigil et al. .............. 340/172.5 |
| 3,905,023 A | 9/1975 | Perpiglia ................. 340/172.5 |
| 4,010,448 A | 3/1977 | Bennett et al. ............. 395/742 |
| 4,034,353 A | 7/1977 | Denny et al. ................ 364/200 |
| 4,068,304 A | 1/1978 | Beausoleil et al. ......... 364/200 |
| 4,821,178 A | 4/1989 | Levin et al. ................ 364/200 |
| 5,103,394 A | 4/1992 | Blasciak ..................... 395/575 |
| 5,151,981 A | 9/1992 | Westcott et al. ............ 395/375 |
| 5,265,255 A | 11/1993 | Bonevento et al. ......... 395/733 |
| 5,394,529 A | 2/1995 | Brown, III et al. ......... 395/375 |
| 5,440,750 A | 8/1995 | Kitai et al. .................. 395/800 |
| 5,461,722 A | 10/1995 | Goto ........................... 395/800 |
| 5,467,473 A | 11/1995 | Kahle et al. ................ 395/800 |
| 5,473,754 A | 12/1995 | Folwell et al. .......... 395/183.21 |
| 5,485,574 A | 1/1996 | Bolosky et al. ........ 395/183.11 |
| 5,491,829 A | 2/1996 | Kau et al. .................... 395/800 |
| 5,506,955 A | 4/1996 | Chen et al. ............ 395/183.02 |
| 5,506,975 A | 4/1996 | Onodera ..................... 395/375 |
| 5,537,541 A * | 7/1996 | Wibecan ................ 395/183.13 |
| 5,539,907 A | 7/1996 | Srivastava et al. ........... 395/700 |
| 5,557,548 A * | 9/1996 | Gover et al. ............ 395/551.01 |
| 5,564,015 A | 10/1996 | Bunnell .................. 395/184.01 |
| 5,581,482 A | 12/1996 | Wiedenman et al. .. 364/551.01 |
| 5,594,864 A | 1/1997 | Trauben ................ 395/183.15 |

OTHER PUBLICATIONS

Brantley et al., "RP3 Performance Monitoring Hardware", Instrumentation for Future Parallel Computing Systems, Ass. for computing Macinery, Inc., pp. 35–47, 1989.*

M. Becker, "*The PowerPC 601 Microprocessor*", IEEE, pp. 54–68.

* cited by examiner

*Primary Examiner*—Scott Baderman
(74) *Attorney, Agent, or Firm*—Sawyer Law Group LLP

(57) ABSTRACT

A method and system for providing a match on a selected event in performance monitoring of a processing system, the processing system including at least one performance monitor counter (PMC) is disclosed. The method and system comprises initializing the at least one PMC and controlling counting in the at least one PMC based upon the nth occurrence of a match to a specified address, where n is grater than or equal to one.

28 Claims, 8 Drawing Sheets

| BUFFER NUMBER | INSTRUCTION TYPE EXECUTION UNIT | #GPR DEST. | #FPR DEST. | FINISHED | EXCEPTION |
|---|---|---|---|---|---|
| 0 | | | | | |
| 1 | 22 | 1 | 0 | 0 | 0 |
| 2 | 22 | 1 | 0 | 0 | 0 |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |

↑ 75 COMPLETION
↑ 73 ALLOCATION

| BITS 0-4 COUNTING ENABLES | BIT 5 INTERRUPT ENABLE | BITS 6-15 INTERRUPT | BIT 16 PMC1 INTERRUPT CONTROL | BIT 17 PMCn, n>1 COUNT CONTROL | BIT 18 PMCn, n>1 COUNT CONTROL | BITS 19-25 PMC1 EVENT SELECTION | BITS 26-31 PMC2 EVENT SELECTION |

MONITOR MODE CONTROL REGISTER 0
(MMCR0)

FIGURE 6B

| BITS 0-4 PMC3 EVENT SELECTION | BITS 5-9 PMC4 EVENT SELECTION | BITS 10-14 PMC5 EVENT SELECTION | BITS 15-19 PMC6 EVENT SELECTION | BITS 20-14 PMC7 EVENT SELECTION | BITS 25-28 PMC8 EVENT SELECTION | BIT 29 FCUIABR | BIT 30 UPDATING MODE PMC1 | BIT 31 UPDATING MODE PMCn, n>1 |

MMCR1

METHOD AND SYSTEM FOR SELECTING AND DISTINGUISHING AN EVENT SEQUENCE USING AN EFFECTIVE ADDRESS IN A PROCESSING SYSTEM

CROSS-REFERENCE TO RELATED APPLICATIONS

The present application is related to applications Ser. No. 08/497,242, entitled "Method and System for Halting Processor Execution in Response to an Enumerated Occurrence of a Selected Combination of Internal States," filed on Jun. 30, 1995, Ser. No. 08/485,953, entitled, "On-Chip Performance Monitoring with a Characterization of Locks/Semaphore Utilization," filed on Jun. 7, 1995, and Ser. No. 08/537,586, entitled "A Method and System for Performance Monitoring Through Identification of Frequency and Length of Time of Execution of Serialization Instructions in a Processing System," Ser. No. 08/537,645, entitled "A Method and System for Performance Monitoring Through Monitoring an Order of Processor Events During Execution in a Processing System," Ser. No. 08/539,023, entitled "A Method and System for Performance Monitoring Time Lengths of Disabled Interrupts in a Processing System," Ser. No. 08/539,102, entitled "A Method and System for Performance Monitoring Stalls to Identify Pipeline Bottlenecks and Stalls in a Processing System," Ser. No. 08/538,505, entitled "A Method and System for Performance Monitoring Efficiency of Branch Unit Operation in a Processing System," Ser. No. 08/536,492, entitled "A Method and System for Performance Monitoring of Misaligned Memory Accesses in a Processing System," Ser. No. 08/537,417, entitled "A Method and System for Performance Monitoring Time Lengths of Instruction Execution in a Processing System," Ser. No. 08/538,774, entitled "A Method and System for Performance Monitoring of Dispatch Stalls in a Processing System", and Ser. No. 08/538,070, entitled "A Method and System for Performance Monitoring of Dispatch Unit Efficiency in a Processing System," filed on the same date as the present application and assigned to the assignee of the present application.

The present application is a continuation in part of application Ser. No. 08/497,242, now U.S. Pat. No. 5,875,294 entitled "Method and System for Halting Processor Execution in Response to an Enumerated Occurrence of a Selected Combination of Internal States," filed on Jun. 30, 1995.

FIELD OF THE INVENTION

The present invention relates to the field of performance monitoring in processing systems, and more particularly, to monitoring during a selected event sequence in a processing system.

BACKGROUND OF THE INVENTION

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The information produced usually guides system architects toward ways of enhancing performance of a given system or of developing improvements in the design of a new system.

Current approaches to performance monitoring include the use of test instruments. Unfortunately, this approach is not completely satisfactory. Test instruments can be attached to the external processor interface, but these can not determine the nature of internal operations of a processor. Test instruments attached to the external processor interface cannot distinguish between instructions executing in the processor. Test instruments designed to probe the internal components of a processor are typically considered prohibitively expensive because of the difficulty associated with monitoring the many busses and probe points of complex processor systems that employ pipelines, instruction prefetching, data buffering, and more than one level of memory hierarchy within the processors. A common approach for providing performance data is to change or instrument the software. This approach however, significantly affects the path of execution and may invalidate any results collected. Consequently, software-accessible counters are incorporated into processors. Most software-accessible counters, however, are limited in the amount of granularity of information they provide.

Further, a conventional performance monitor is usually unable to capture machine state data until an interrupt is signaled, so that results may be biased toward certain machine conditions that are present when the processor allows interrupts to be serviced. Also, interrupt handlers may cancel some instruction execution in a processing system where, typically, several instructions are in progress at one time. Further, many interdependencies exist in a processing system, so that in order to obtain any meaningful data and profile, the state of the processing system must be obtained at the same time across all system elements. Accordingly, control of the sample rate is important because this control allows the processing system to capture the appropriate state. It is also important that the effect that the previous sample has on the sample being monitored is negligible to ensure the performance monitor does not affect the performance of the processor. Accordingly, there exists a need for a system and method for effectively monitoring processing system performance that will efficiently and noninvasively identify potential areas for improvement.

More particularly, because monitoring of a user specified fragment of code is of interest, a need exists to allow the control of monitoring as a user selectable support using an effective address that is not unique to a process as an identifier of an event intended to be process dependent.

SUMMARY OF THE INVENTION

The present invention presents system and method aspects that meet these needs. With the present invention, improved performance in a processing system is obtainable. In accordance with one aspect, a method and system for providing a match on a selected event in performance monitoring of a processing system, the processing system including at least one performance monitor counter (PMC) is disclosed. The method and system comprises initializing the at least one PMC and controlling counting in the at least one PMC based upon the nth occurrence of a match to a specified process, where n is greater than or equal to one.

Further, since the data gathered in accordance with the present invention occurs during real-time system processing, system designers have improved ability to more accurately determine specific deficiencies in system performance and develop system improvements to overcome those deficiencies. These and other advantages of the aspects of the present invention will be more fully understood in conjunction with the following detailed description and accompanying drawings.

BRIEF DESCRIPTION OF THE DRAWINGS

FIG. 3 is a conceptual illustration of a reorder buffer of the sequencer unit of FIG. 2.

FIGS. 6a and 6b illustrate monitor mode control registers (MMCRn) utilized to manage a plurality of counters.

DETAILED DESCRIPTION

Figure 1:
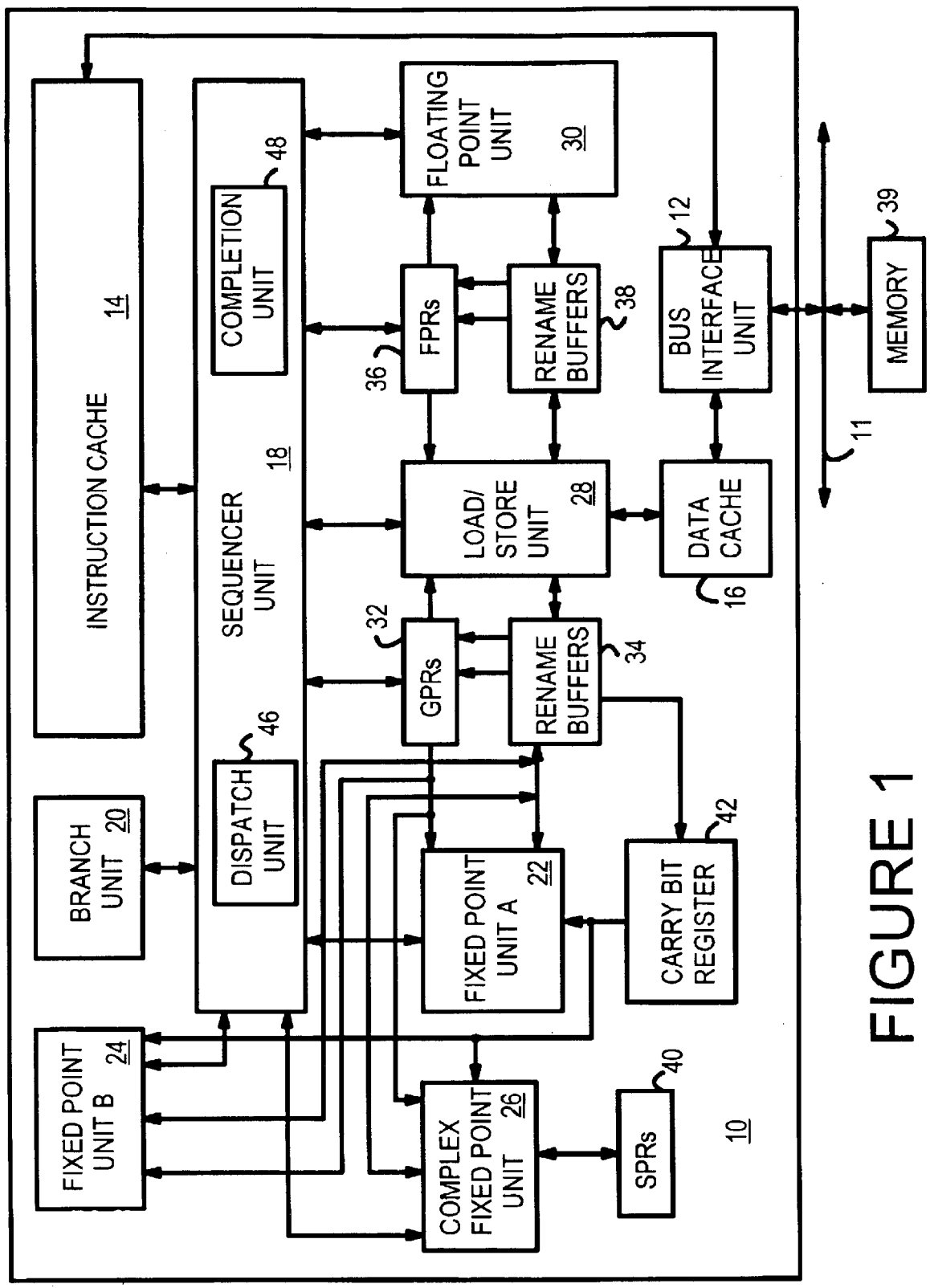
FIG. 1 is a block diagram of a processor for processing information in accordance with the present invention.

The present invention relates to performance monitoring in a processing system that includes at least one processor. The following description is presented to enable one of ordinary skill in the art to make and use the invention and is provided in the context of a patent application and its requirements. Various modifications to the preferred embodiment and the generic principles and features described herein will be readily apparent to those skilled in the art.

In a system and method in accordance with the present invention, a history of events is gathered in a processing system. The historical data is collected in a manner that is noninvasive to the system's operation but occurs within the processor. Thus, the data is unbiased and unaffected by external test instruments, while obtaining a cycle by cycle history of events during processing. Further, a straightforward manner of specifically choosing the instructions that initiate and complete monitoring activity is also obtained, which is normally more difficult in a processing system.

In addition, the present invention provides the ability to obtain a complete picture of the critical bottlenecks in a processing system at each pipeline stage. More specifically, in a processing system's dispatch unit, load/store unit and completion unit which have unique and significant importance in a processing system, can be identified. The dispatch and completion units are relatively new units that are used to effectively support the execution of instructions that are processed out of sequential order. In addition, stalls of the various execution units are monitored for an overall understanding of the cost associated with each unit's bottleneck. For purposes of this discussion, a stall is a situation in which an execution element cannot complete a current sequence, because a required resource is temporarily unavailable.

Other forms of monitoring system performance include identifying the occurrence of idles. For purposes of this discussion, an idle condition refers to an execution element having nothing to do, as opposed to an operating system routine of "having nothing to do" which is often implemented by a branch to self waiting for an interrupt to occur.

Potential areas of system inefficiency are also identifiable through the performance monitoring of the present invention. One measurement of efficiency is indicated by the distribution of the number of instructions executed per cycle. Other forms of monitoring efficiency provide further data for analysis, including branch technique efficiency, data alignment efficiency, and serialization instruction occurrence. Time lengths of disabled interrupts and execution are also capably provided for analysis of processing system efficiency.

With the data provided from the monitoring, system enhancements are suitably made to fine tune the processing system's performance by both software and hardware system designers. The changes to be made are, of course, dependent on the unique data retrieved during individual system operation. Thus, although the ramifications of the data may be unique to each system, the ability to effectively obtain such data and monitor performance is important for all processing systems.

An exemplary embodiment of the present invention and its advantages is better understood by referring to FIGS. 1–8 of the drawings, like numerals being used for like and corresponding parts of the accompanying drawings.

FIG. 1 is a block diagram of a processor 10 system for processing information according to the preferred embodiment. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information through a completion unit 48. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining". In a significant aspect of the preferred embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information) through a dispatch unit 46. In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out of order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Although it would be desirable for each instruction to take one machine cycle to complete each of the stages of instruction processing, in most implementations, there are some instructions (e.g., complex fixed point instructions executed by CFXU 26) that require more than one cycle. Accordingly, a variable delay may occur between a particular instruction's execution and completion stages in response to the variation in time required for completion of preceding instructions.

Figure 2:
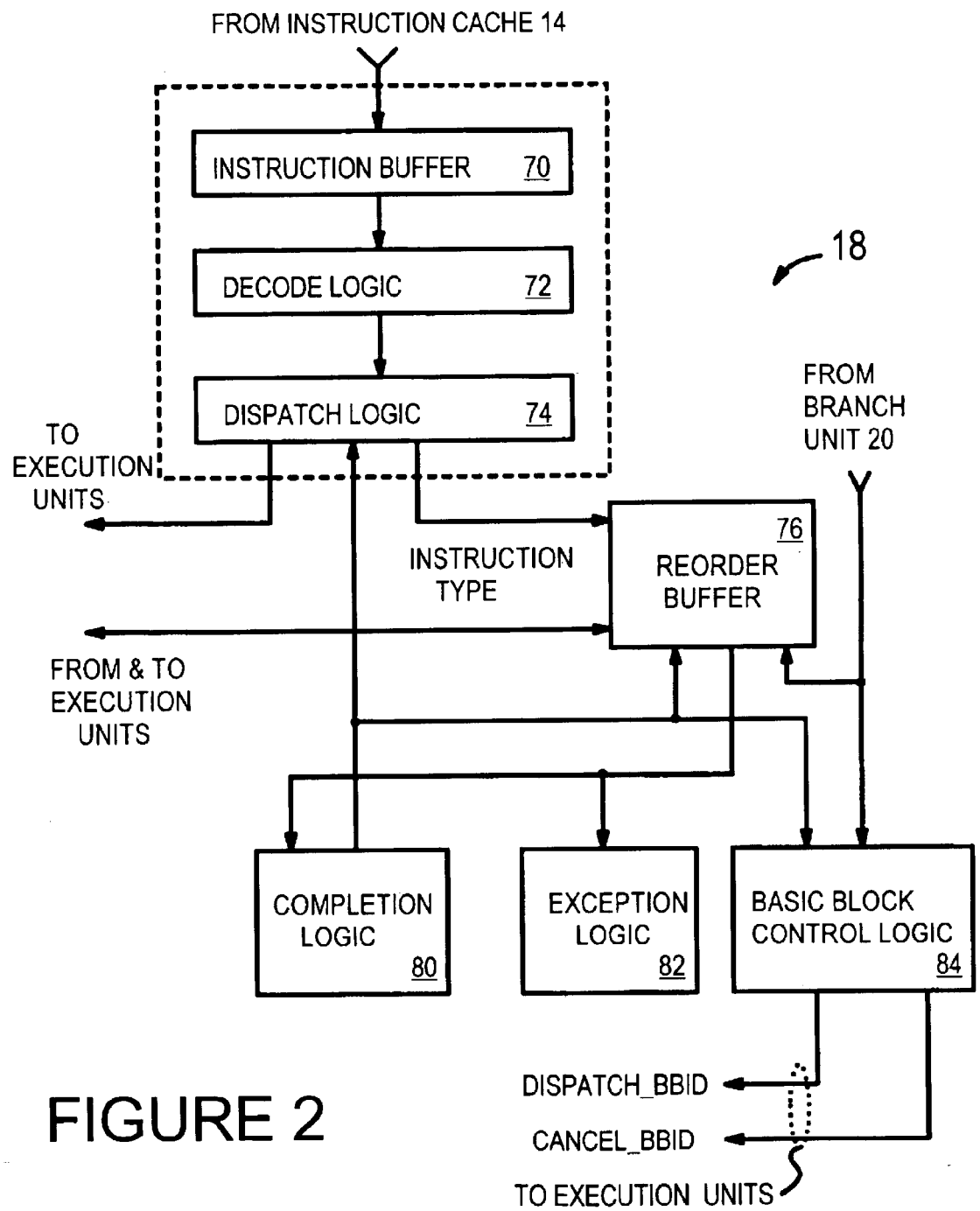
FIG. 2 is a block diagram of a sequencer unit of the processor of FIG. 1.

FIG. 2 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

Figure 5:
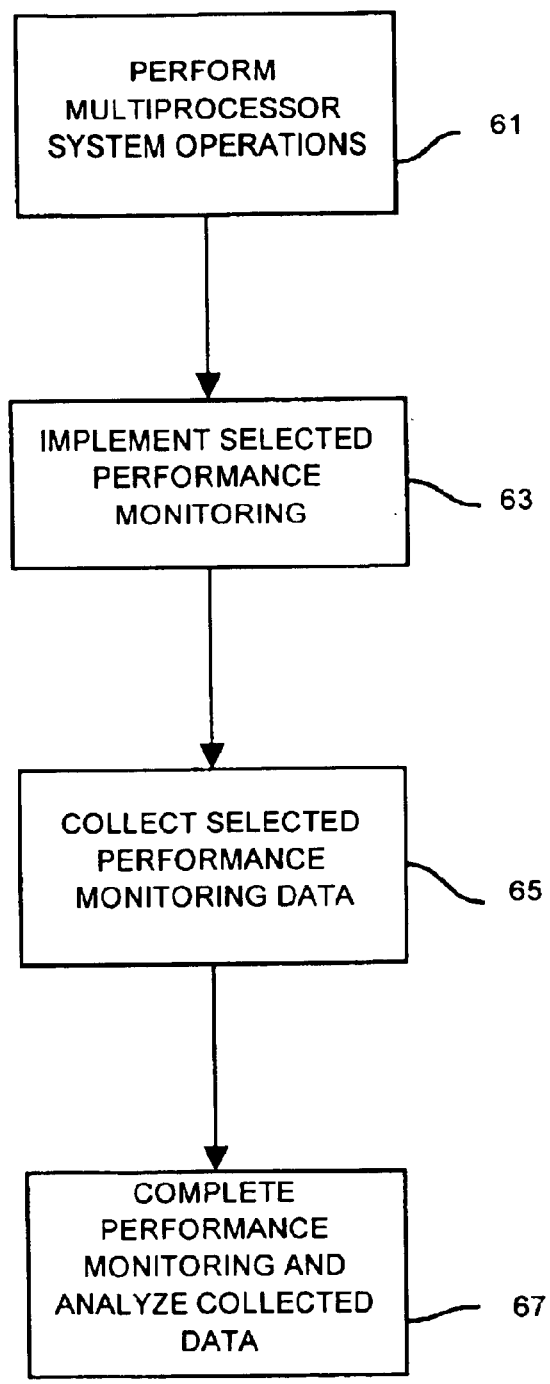
FIG. 5 is a block diagram of an overall process flow in accordance with the present invention of processing system operation including performance monitoring.

FIG. 3 is a conceptual illustration of a reorder buffer 76 of sequencer unit 18 of the preferred embodiment. As shown in FIG. 5, reorder buffer 76 has sixteen entries respectively labelled as buffer numbers 0–15. Each entry has five primary fields, namely an "instruction type" field, a "number-of-GPR destinations" field, a "number-of-FPR destinations" field, a "finished" field, and an "exception" field.

Referring also to FIG. 2, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1–15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 1 of FIG. 3, reorder buffer 76 indicates the instruction is dispatched to FXUA 22. In other significant aspects of the preferred embodiment, entry 1 further indicates the dispatched instruction has one GPR destination register (such that "number-of-GPR destinations" =1), has zero FPR destination registers (such that "number-of-FPR destinations" =0), is not yet finished (such that "finished" =0), and has not yet caused an exception (such that "exception" =0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished" =1). If the execution unit encounters an exception during execution of the dispatched instruction, the execution unit modifies the entry's "exception" field (such that "exception" =1).

FIG. 3 shows an allocation pointer 73 and a completion pointer 75. Processor 10 maintains such pointers for controlling reading from and writing to reorder buffer 76. Processor 10 maintains allocation pointer 73 to indicate whether a reorder buffer entry is allocated to (or "associated with") a particular instruction. As shown in FIG. 3, allocation pointer 73 points to reorder buffer entry 3, thereby indicating that reorder buffer entry 3 is the next reorder buffer entry available for allocation to an instruction.

Also processor 10 maintains completion pointer 75 to indicate (for a reorder buffer entry previously allocated to a particular instruction) whether the particular instruction satisfies the following conditions:

Condition 1— The execution unit (to which the instruction is dispatched) finishes execution of the instruction;

Condition 2— No exceptions were encountered in connection with any stage of processing the instruction; and Condition 3— Any previously dispatched instruction satisfies Condition 1 and Condition 2.

As shown in FIG. 3, completion pointer 75 points to reorder buffer entry 1, thereby indicating that reorder buffer entry 1 is the next reorder buffer entry capable of satisfying Conditions 1, 2 and 3. Accordingly, "valid" reorder buffer entries can be defined as the reorder buffer entry pointed to by completion buffer 75 and its subsequent reorder buffer entries that precede the reorder buffer entry pointed to by allocation pointer 73.

Referring again to FIG. 2, the entries of reorder buffer 76 are read by completion logic 80 and exception logic 82 of sequencer unit 18. In response to the "exception" fields of reorder buffer 76, exception logic 82 handles exceptions encountered during execution of dispatched instructions. In response to the "finished" fields and "exception" fields of reorder buffer 76, completion logic 80 indicates "completion" of instructions in order of their programmed sequence. Completion logic 80 indicates "completion" of an instruction if it satisfies the following conditions.

Condition 1—The execution unit (to which the instruction is dispatched) finishes execution of the instruction (such that "finished" =1 in the instruction's associated entry in reorder buffer 76);

Condition 2—No exceptions were encountered in connection with any stage of processing the instruction (such that "exception" =0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

Figure 4:
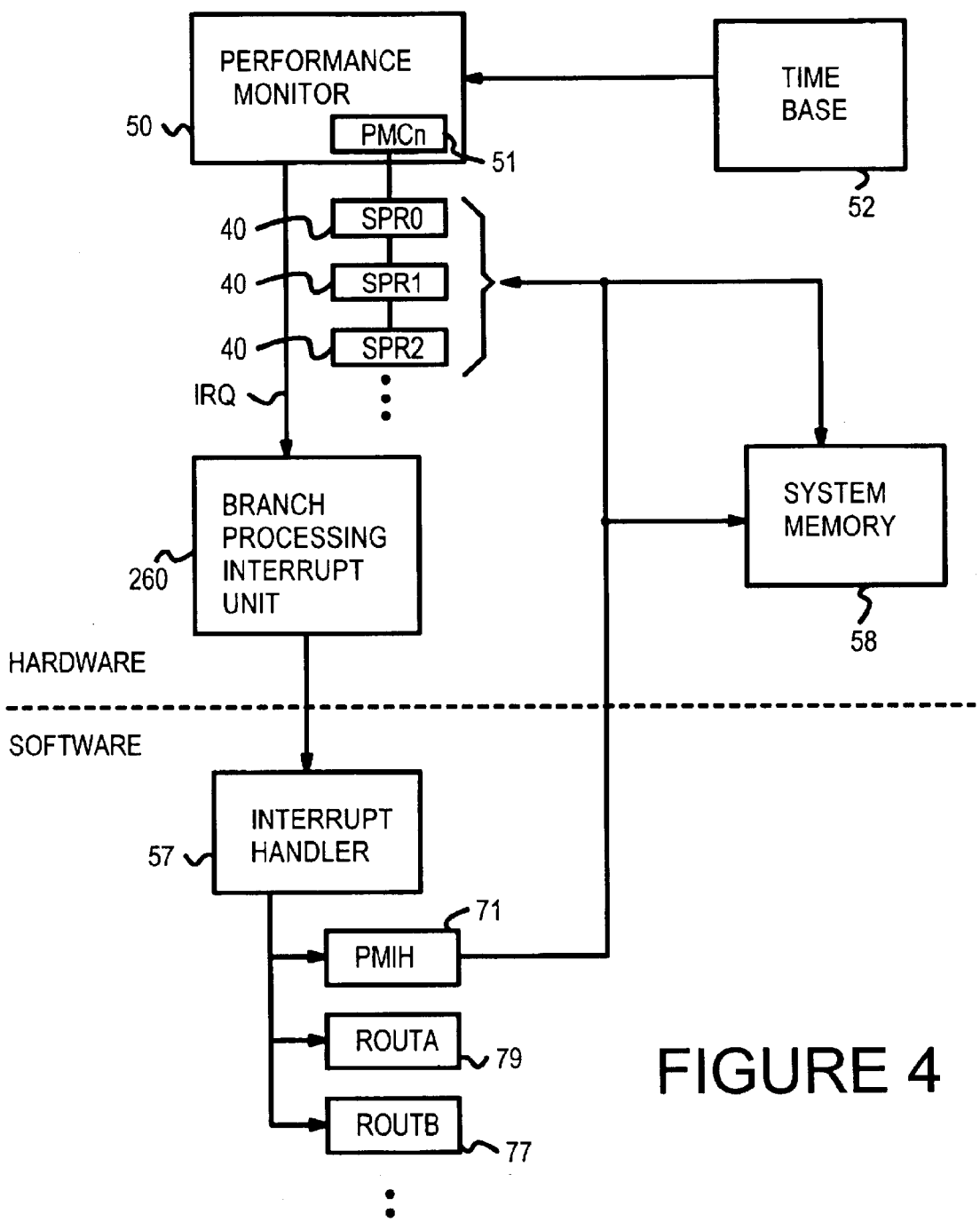
FIG. 4 is a block diagram of a performance monitoring aspect of the present invention.

Referring to FIG. 4, a feature of processor 10 is performance monitor (PM) 50. Performance monitor 50, in a preferred embodiment, is a software-accessible mechanism intended to provide detailed information with significant granularity concerning the utilization of PowerPC instruction execution and storage control. Generally, the performance monitor 50 includes an implementation-dependent number (e.g., 2–8) of counters 51, e.g, PMC1-PMC8, used to count processor/storage related events. Further included in performance monitor 50 are monitor mode control registers (MMCRn) that establish the function of the counters PMCn, with each MMCR usually controlling some number of counters. Counters PMCn and registers MMCRn are typically special purpose registers physically residing on the processor 10, e.g., a PowerPC. These special purpose registers are accessible for read or write via mfspr (move from special purpose register) and mtspr (move to special purpose register) instructions, where the writing operation is preferably only allowed in a privileged or supervisor state, while reading is preferably allowed in a problem state since reading the special purpose registers does not change the register's content. In a different embodiment, these registers may be accessible by other means such as addresses in I/O space.

Typically, the MMCRn registers are partitioned into bit fields that allow for event/signal selection to be recorded/counted. Selection of an allowable combination of events causes the counters to operate concurrently.

Preferably, the MMCRn registers include controls, such as counter enable control, counter negative interrupt controls, counter event selection, and counter freeze controls, with an implementation-dependent number of events that are selectable for counting. Smaller or larger counters and registers may be utilized to correspond to a particular processor and bus architecture or an intended application, so that a different number of special purpose registers for MMCRn and PMCn may be utilized without departing from the spirit and scope of the present invention.

The performance monitor 50 is provided in conjunction with a time base facility 52 which includes a counter that designates a precise point in time for saving the machine state. The time base facility 52 includes a clock with a frequency that is typically based upon the system bus clock and is a required feature of a superscalar processor system including multiple processors 10 to provide a synchronized time base. The time base clock frequency is typically provided at the frequency of the system bus clock or some fraction, e.g., ¼, of the system bus clock.

Predetermined bits within a 64-bit counter included in the time base facility 52 are selected for monitoring such that the increment of time between monitored bit flips can be controlled. Synchronization of the time base facility 52 allows all processors in a multiprocessor system to initiate operation in synchronization. Examples of methods for performing such synchronization are provided in co-pending U.S. patent application serial no. 08/358,220 entitled "Performance Monitoring in a Multiprocessor System with Interrupt Masking", assigned to assignee of the present invention and incorporated herein by reference in its entirety.

Time base facility 52 further provides a method of tracking events occurring simultaneously on each processor of multiprocessor system. Since the time base facility 52 provides a simple method for synchronizing the processors, all of the processors of a multiprocessor system detect and react to a selected single system-wide event in a synchronous manner. The transition of any bit or a selected one of a group of bits may be used for counting a condition among multiple processors simultaneously such that an interrupt is signalled when a bit flips or when a counted number of events has occurred.

In operation, a notification signal is sent to PM 50 from time base facility 52 when a predetermined bit is flipped. The PM 50 then saves the machine state values in special purpose registers. In a different scenario, the PM 50 uses a "performance monitor" interrupt signalled by a negative counter (bit zero on or "1") condition. The act of presenting the state information including operand and address data may be delayed if one of the processors has disabled interrupt handling.

In order to ensure that there is no loss of data due to interrupt masking, when the interrupt condition is signaled, the processors capture the effective instruction and operand (if any) addresses of "an" instruction in execution and present an interrupt to the interrupt resolution logic 57, which employs various interrupt handling routines 71, 77, 79. These addresses are saved in registers, Saved Data Address (SDA) and Saved Instruction Address (SIA), which are designated for these purposes at the time of the system-wide signaling. The state of various execution units are also saved. This state of various execution units at the time the interrupt is signalled is provided in a saved state register (SSR). This SSR could be an internal register or a software accessible SPR. Thus, when the interrupt is actually serviced, the content of these registers provide the information concerning current instructions that are currently executing in the processor at the time of the signaling.

When the PM 50 receives the notification from time base 52 to indicate that it should record "sample data", an interrupt signal is output to a branch processing unit 20. Concurrently, the sample data (machine state data) is placed in SPRs 40 including the SIA, SDA and SSR which are suitably provided as registers or addresses in I/O space. A flag may be used to indicate interrupt signalling according to a chosen bit transition as defined in the MMCRn. Of course, the actual implementation of the time base facility 52 and the selected bits is a function of the system and processor implementation.

A block diagram, as shown in FIG. 5, illustrates an overall process flow in accordance with the present invention of superscalar processor system operation including performance monitoring. The process begins in block 61 with the processing of instructions within the superscalar processor system. During the superscalar processor system operation, performance monitoring is implemented in a selected manner via block 63 through configuration of the performance monitor counters by the monitor mode control registers and performance monitoring data is collected via block 65.

By adjusting the values of the performance monitor counts, that is by setting the values of the counters high enough so that an exception is signalled by some predetermined number of occurrences of an event, a profile of system performance can be obtained. Further, for purposes of this disclosure, a performance monitoring interrupt preferably occurs at a selectable point in the processing. As described in more detail below, a predetermined number of events is suitably used to select the stop point. For example, counting can be programmed to end after two instructions by causing the counter to go negative after the completion of two instructions. Further, for purposes of this disclosure, the time period during which monitoring occurs is preferably known. Thus, the data collected has a context in terms of the number of minutes, hours days, etc. over which the monitoring is performed.

As described herein below, selected performance monitoring includes reconstructing a relationship among events, identifying false triggering, identifying bottlenecks, monitoring stalls, monitoring idles, determining the efficiency of operation of a dispatch unit, determining the effectiveness of branch unit operations, determining a performance penalty of misaligned data accesses, identifying a frequency of execution of serialization instructions, identifying inhibited interrupts, and applying Little's Law to identify efficiency.

The selected performance monitoring routine is completed and the collected data is analyzed via block 67 to identify potential areas of system enhancements. A profiling mechanism, such as a histogram, may be constructed with the data gathered to identify particular areas in the software or hardware where performance may be improved. Further for those events being monitored that are time sensitive, e.g., a number of stalls, idles, etc., the count number data is collected over a known number of elapsed cycles, so that the data has a context in terms of a sampling period. It should be appreciated that analysis of collected data may be facilitated using such tools as "aixtrace" or a graphical performance visualization tool "pv", each of which is available from IBM Corporation.

In FIG. 6a, an example representation of one configuration of MMCRO suitable for controlling the operation of two PMC counters, e.g., PMC1 and PMC2, is illustrated. As shown in the example, MMCRO is partitioned into a number of bit fields whose settings select events to be counted, enable performance monitor interrupts, specify the conditions under which counting is enabled, and set a threshold value (X).

The threshold value (X) is both variable and software selectable and its purpose is to allow characterization of certain data, such that by accumulating counts of accesses that exceed decreasing threshold values, designers gain a clearer picture of conflicts. The threshold value (X) is considered exceeded when a decrementer reaches zero before the data instruction completes. Conversely, the threshold value is not considered exceeded if the data instruction completes before the decrementer reaches zero. Of course, depending on the data instruction being executed, completed has different meanings. For example, for a load instruction, "completed" indicates that the data associated with the instruction was received, while for a "store" instruction, "completed" indicates that the data was successfully written. A user readable counter, e.g., PMC1, suitably increments every time the threshold value is exceeded.

A user may determine the number of times the threshold value is exceeded prior to the signalling of performance monitor interrupt. For example, the user may set initial values for the counters to cause an interrupt on the 100th data miss that exceeds the specified threshold. With the appropriate values, the PM facility is readily suitable for use in identifying system performance problems.

Referring to FIG. 6a, as illustrated by this example, bits 0–4 and 18 of the MMCRO determine the scenarios under which counting is enabled. By way of example, in a preferred embodiment, bit 0 is a freeze counting bit (FC). When at a high logic level (FC=1), the values in PMCn counters are not changed by hardware events, i.e., counting is frozen. When bit 0 is at a low logic level (FC=0), the values of the PMCn can be changed by chosen hardware events. Bits 1–4 indicate other specific conditions under which counting is frozen.

For example, bit 1 is a freeze counting while in a supervisor state (FCS) bit, bit 2 is a freeze counting while in a problem state (FCP) bit, bit 3 is a freeze counting while PM=1 (FCPM1) bit, and bit 4 is a freeze counting while PM=0 (FCPM0) bit. PM represents the performance monitor marked bit, bit 29, of a machine state register (MSR) (an SPR 40, FIG. 1). For bits 1 and 2, a supervisor or problem state is indicated by the logic level of the PR (privilege) bit of the MSR. The states for freezing counting with these bits are as follows: for bit 1, FCS=1 and PR=0; for bit 2, FCP=1 and PR=1; for bit 3, FCPM1=1 and PM=1; and for bit 4, FCPMO=1 and PM=0. The state for allowing counting with these bits are as follows: for bit 1, FCS=1 and PR=1; for bit 2, FCP=1 and PR=0; for bit 3, FCPM1=1 and PM=0; and for bit 4, FCPMO=1 and PM=1.

Bits 5, 16, and 17 are utilized to control interrupt signals triggered by PMCn. Bits 6–9 are utilized to control the time or event-based transitions. The threshold value (X) is variably set by bits 10–15. Bit 18 control counting enablement for PMCn, n>1, such that when low, counting is enabled, but when high, counting is disabled until bit 0 of PMC1 is high or a performance monitoring exception is signaled. Bits 19–25 are used for event selection, i.e, selection of signals to be counted, for PMC1.

FIG. 6b illustrates a configuration of MMCR1 in accordance with a preferred embodiment of the present invention. Bits 0–4 suitably control event selection for PMC3, while bits 5–9 control event selection for PMC4. Similarly, bits 10–14 control event selection for PMC5, bits 15–19 control event selection for PMC6, bits 20–24 control event selection for PMC7, and bits 25–28 control event selection for PMC8.

The counter selection fields, e.g., bits 19–25 and bits 26–31 of MMCRO and bits 0–28 of MMCR1, preferably have as many bits necessary to specify the full domain of selectable events provided by a particular implementation.

At least one counter is required to capture data for performance analysis. More counters provide for faster and more accurate analysis. If the scenario is strictly repeatable, the same scenario may be executed with different items being selected. If the scenario is not strictly repeatable, then the same scenario may be run with the same item selected multiple times to collect statistical data. The time from the start of the scenario is assumed to be available via system time services so that intervals of time may be used to correlate the different samples and different events.

Selecting and Distinguishing an Event Sequence Using An Effective Address

Bit 29 of MMCR1 is preferably used as a freeze counting until an IABR match signal occurs (FCUIABR) bit. An instruction address breakpoint register (IABR) match occurs while the IABR breakpoint is not enabled. For purposes of this discussion, the IABR refers to a register defined to hold an effective address that is used to compare with either a logical address of the instruction in the decode stage or the effective address of a branch target. In a preferred embodiment, the IABR is a supervisor-level register.

Using bit 29 of MMCR1, a low logic level preferably indicates that counting is enabled. A high logic level in bit 29 preferably indicates that counting is disabled until an enabled IABR match occurs. To indicate that an IABR match is enabled, bits 0–4 of MMCRO (counting enable bits) and the PM bit of the machine state register (MSR) are preferably used. Once the enabled IABR match occurs, bit 29 of MMCR1 is reset and counting occurs.

The equations related to the counting bit 29 of MMCR1 are shown below.

-bit 29: Freeze Counting until an IABR match
   0b0 Counting is enabled
   0b1 Counting is frozen until an "enabled" IABR march occurs. An IABR match is said to be "enabled" if counting is allowed as a function of the MSR and MMCRO bits 0–4. When an enabled IABR match occurs, hardware resets FCUIABR to zero and counting is enabled.

If the MSR and MMCRO bits 0–4 are such that counting is disabled, then an IABR match does not reset FCUIABR to zero.

IF ( (FC==1) or
     ( (FCS==1) and (MSR(PR)==0) ) or
     ( (FCP==1) and (MSR(PR)==1) ) or
     ( (FCPM1==1) and (MSR(PM)==1) ) or
     ( (FCPMO==1) and (MSR(PM)==0) ) ) THEN
     an IABR match signal is ignored
   ENDIF
   IF
   ( (FC==0) ) and
   ( (FCS==0 or (MSR(PR)==1) ) and
   ( (FCP==0) or (MSR(PR)==0) ) and
   ( (FCPM1==0) or (MSR(PM)==0) ) and
   ( (FCPMO==0) or (MSR(PM)==1) ) ) THEN
     an IABR match signal causes hardware to reset the FCUIABR to zero
   ENDIF The combination of bit 29 of MMCR1 with the conditions for freezing counting as utilized through bits 0–4 of MMCRO and the PM bit (bit 29 of the MSR) aids in controlling monitoring of an effective address in a chosen process. At times, the effective address of an instruction for monitoring may occur in a process not intended for monitoring. That is, using an effective address as defined in the IABR may create false triggering when the same effective address occurs in different processes. Thus, a "wrong" process may initiate counting before a "correct" process, i.e., a process intended for monitoring, has executed the instruction. The ability to accurately initiate counting at a specified instruction within a specified sequence of events is significant and readily achievable through the present invention.

Because the PM bit is in the MSR, which is typically saved and restored as part of the process state, the PM bit may be used to mark a specific process for counting. By specifying FCS=1 and FCPMO=1 in MMCRO, the IABR match will trigger counting only when a particular instruction occurs in a specified process during a problem state. Counting stops in a predetermined manner, for example, by having PMC1 count instructions and go negative after one hundred (100) instructions are completed. Using the PM bit in conjunction with bit 29 of MMCR1 as described, effectively provides a way to unambiguously allow the effective address of an instruction to control operations, such as performance monitoring counting. In a similar manner, requiring a specific bit to be high, such as the PM bit in the MSR, allows for the same control for break point or any other operation where the effective address is used to trigger or stop a condition or event.

In a further embodiment, the IABR will be used as an event that can be counted so that the triggering of the other counters can be associated with a user selectable predetermined number of IABR matches (one or more matches). In this further embodiment triggering is controlled by bit 18 in MMCR0 (FIG. 6a) which, when asserted (set on or 1), will cause the counters that are selected to other than IABR hits to start counting their own selected events when the counter that does count the IABR hit becomes negative (most significant bit set on or 1).

Yet in another embodiment, the data address breakpoint register (DABR) will be defined as a register that contains an effective address that is used to compare to the address belonging to a memory access. As is obvious to those skilled in the art, the same methodology associated with the IABR may be applied to any address, such as the DABR.

Performance Monitoring Through Monitoring an Order of Processor Events During Execution The PM facility is also preferably implemented to reconstruct a relationship among events in the SP system. In this way, a history of time ordered events occurring over a desired number of cycles is gathered for better analysis and improved ability to enhance system performance. This is history of time ordered events is defined as history mode. In an alternative embodiment each of the PMCs would have a bit associated with it for placing the performance monitor in history mode. Through the history mode a time-ordered relationship between predetermined events can be analyzed to determine the performance of the system. Count type events, such as number of instructions, may be selected.

In a preferred embodiment, which reduces the number of control bits required, the PMCn are configured through use of a bit set, bits 30 and 31, of the MMCR1 to define the operation states of the PMCn.

Figure 7:
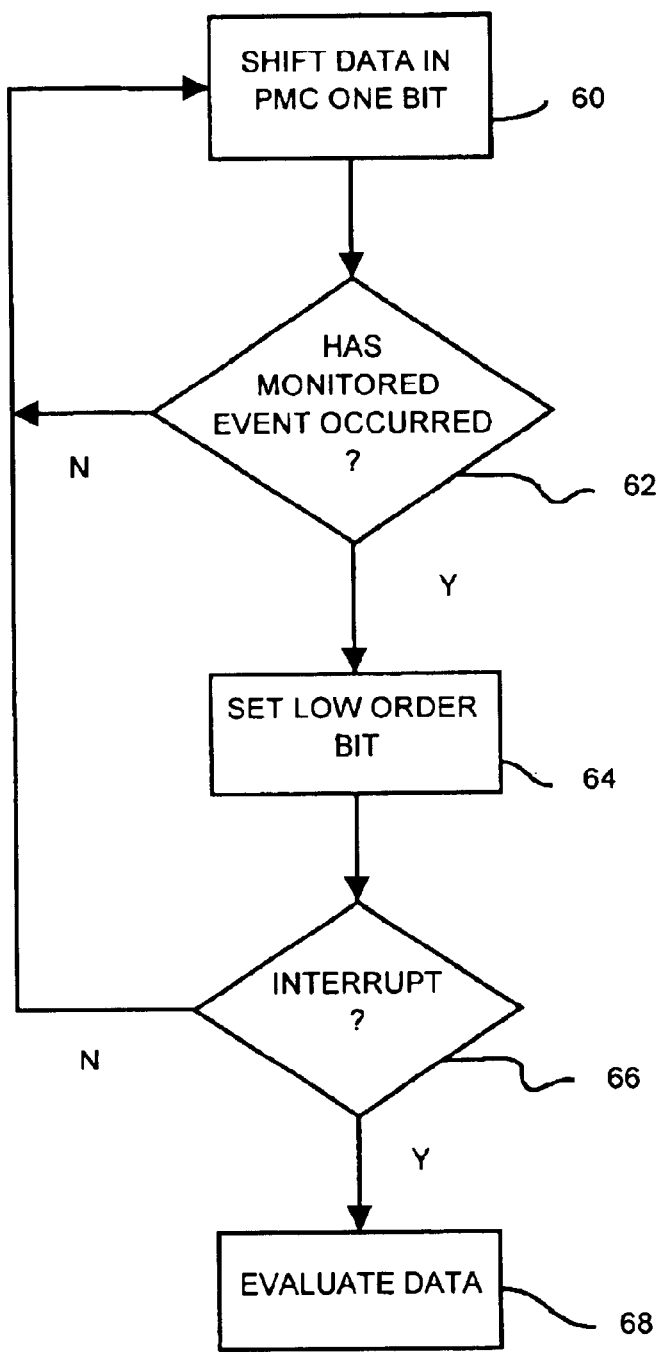
FIG. 7 illustrates a flow diagram describing the operations of each PMC in history mode in accordance with one aspect of the present invention.

In a preferred embodiment, when the bit set of bits 30–31 of MMCR1 has a first logic level with both bits at a low logic level, i.e., "0" level, each PMCn is in normal counting mode, as described hereinabove. When the bit set has a second logic level with bit 30 having a low ("0") logic level and bit 31 having a high ("1") logic level, PMC1 is in counting mode and PMCn, n>1 are in history mode. FIG. 7 illustrates a flow diagram describing the operations of each PMC in history mode.

Referring to FIG. 7, history mode operation includes shifting the data of the PMC one bit during each cycle via step 60. A determination of whether a monitored event has occurred during the current cycle is made via step 62. If the event has not occurred, no data changes are made to the PMC and the data in the PMC is shifted during the next cycle via step 60. If the event has occurred, then a low order bit of the PMC is set to a high logic level via step 64. By way of example, if data cache misses were being monitored, and a data cache miss had occurred during that cycle, the low order bit of the PMC in history mode monitoring that event would be set. In a preferred embodiment, each counter has a preassigned event to be monitored. In addition, in such an embodiment, selection of an event such as the number of instructions dispatched would be interpreted as "at least one instruction was dispatched."

Once the low order bit has been set, a check for an interrupt is made to determine if the predetermined period of monitoring, e.g., 1000 cycles, has been exhausted via step 66. When the monitoring period has not been completed, the process continues via step 60. When the monitoring period has been completed, data evaluation then occurs via step 68. This approach produces a time ordered relationship between the monitored events. Thus, not only does the data identify whether a selected event occurred, but the data also indicates an exact sequence of the order that the events occurred.

A third bit set in MMRC1 (FIG. 6b) having bit 30 at a high logic level and bit 31 at a low logic level is suitably used for a further history mode selection. A high level bit in bit 30 indicates that PMC1 is in history mode, while a low level bit in bit 31 indicates that PMCn, n>1 are in counting mode.

A fourth bit set having both bits 30 and 31 at high logic levels is suitable for placing all of the PMCs, PMCn, in history mode operation. It should be appreciated that although the bit sets described have particular logic levels achieving the different states of operation, they are meant as illustrative and not restrictive, so that other combinations of logic levels may be used to achieve the described operations. Of course, although the bit set comprises two bits in the preferred embodiment, the bit set may comprise other numbers of bits, for example, one bit for all the PMCn, to provide control of the PMCn for history mode operation. For example, a high level in a one bit configuration would suitably indicate all counters are in history mode, while a low bit would suitably indicate all counters are in counting mode.

Performance Monitoring to Identify Bottlenecks and Stalls

With the history of events being known over a particular time period, analysis of problem areas within the processor system is more readily identifiable. In a further aspect, specific problems that lead to processor bottlenecks are also identifiable with the performance monitoring facility. In a preferred embodiment, the performance monitoring facility is utilized to identify the relative time each unit within the processor spends being stalled, that is, causing a bottleneck. By determining the unit(s) which stall the longest, further analysis of the exact reasons for those unit(s) to be stalled may be studied and the relative amount of time of each type of stall can be determined.

In order to effectively evaluate the flow of instructions through the processor's pipeline, all stages are preferably examined simultaneously. Monitoring a pipeline or execution unit of a processor as stalls occur provides valuable information in determining ways to improve performance and reduce the stalls. As before mentioned, for purposes of this discussion, a stall is a situation in which an execution element cannot complete a current sequence, because a required resource is temporarily unavailable. As described above with reference to FIG. 1, an instruction is normally processed as six stages, namely fetch, decode, dispatch, execute, completion, and writeback. Thus, a stall in any one of these stages can adversely affect the ability of the other stages to complete processing.

Using the PMCn and configuring them with the MMCRn, monitoring of stalls is performed so that a count of a number of cycles that various execution elements are stalled is achieved. In a preferred embodiment, the number of cycles that the dispatch unit is stalled is counted, as well as the number of cycles that each execution unit, including the fixed point (complex and simple) units, floating point unit, and branch unit, is stalled. Similarly, the number of cycles the load/store unit and the completion unit is stalled is also counted. Thus, rather than counting the number of occurrences that a specific instruction is being executed, stalls of any instruction execution are monitored.

In a more particular example, stalls within a completion unit are identified. The completion unit is a new unit required to support out of order execution of instructions. During completion unit stalls, instructions may be executing, but the completion of the instructions is inhibited, causing a degradation of the processor's performance. Typically, the completion unit stalls when it is unable to place the results of an operation in the rename registers due to some unfinished instruction. Because load and store instructions manage data that is used by all other instructions, monitoring the stalls due to unfinished loads and stores is particularly necessary. Of course, other forms of unfinished instructions are also readily monitored as necessary to determine other instructions causing stalls.

Figure 8:
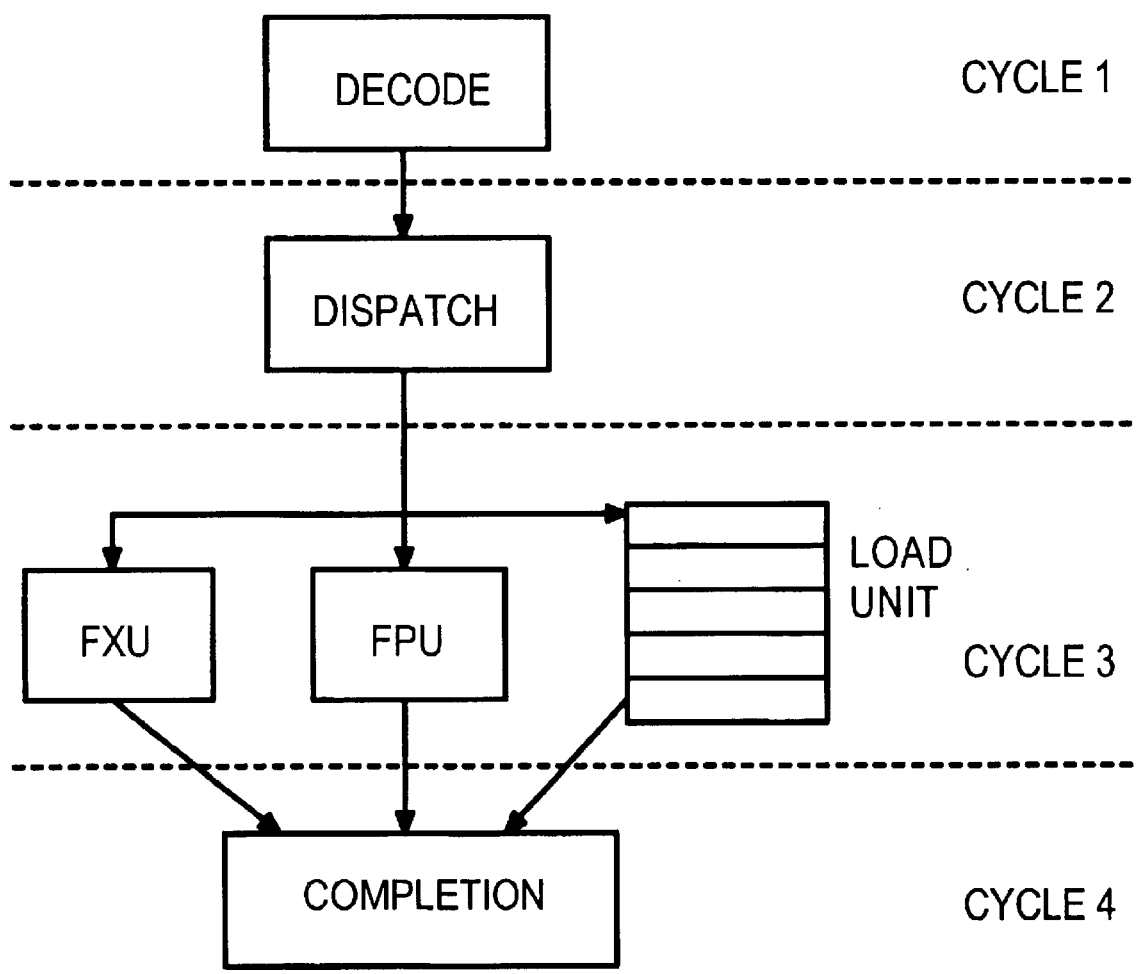
FIG. 8 is a diagram of a typical superscalar pipeline in accordance with one aspect of the present invention.

As an example, FIG. 8 presents three steps of a program having the instructions Load, Add, Add, and a corresponding block diagram showing a sequence of cycles such a program takes. During cycle 1, all three instructions are decoded. During cycle 2, all three instructions are dispatched to the appropriate units. During cycle 3, the Load instruction is placed in the Load unit and each of the Add instructions is placed in one of the available fixed point units. During what should be the completion cycle, cycle 4, the Load instruction is not finished because data was needed from memory. However, both add instructions are ready to be completed. A stall occurs in the completion of these Add instructions until the Load instruction retrieves the necessary data. Of course, if the Load instruction takes several cycles to retrieve the data, other units may also stall waiting for the Load operation in the completion unit to finish.

Of course, the performance monitor is used in a manner suitable with the functionality as described herein. Thus, a PMCn is preferably used by selecting the appropriate bits in the MMCRn to monitor stalls, so that the number of stalls occurring are counted. An interrupt is signalled upon a particular number of stalls happening, at which time the SIA reflects the instruction causing stalling under the conditions being monitored. Of course, by utilizing the history mode feature, an interrelationship among conditions causing stalls can be determined.

In order to identify that a load instruction and/or any other instruction is causing a stall, the PMCn are suitably utilized. For example, a determination may be made that the completion unit is in a stall condition for the required predetermined number of times. Upon such a determination, the instruction being executed is captured in the SIA and points to an instruction holding up the completion. An instruction is unable to complete if, for example, there is presently no address. In another example, an instruction is unable to complete if the data that is needed is not in the cache.

In a similar manner, stalls within a dispatch unit are identified. Of course, since the dispatch unit is concerned with different functions than the completion unit, the reasons for its stalls are different. Thus, for a dispatch unit, events that may cause stalls include no execution unit is available, i.e., all units are busy, no rename registers are available, no reorder buffer is available, no condition rename buffer is available, there is a counter-link register interlock condition, and no instructions available for dispatching. As with all other types of performance analysis operations, the relative time for each of the different stall conditions are ascertained along with the total amount of elapsed time for the samples. Collecting this data, along with the identification of the segments of code causing the most significant impact due to a specified stall condition, provides the information required to make system changes to avoid the stall conditions. These changes can involve compiler changes, software changes, and hardware design changes as appropriately determined by the results of the performance analysis.

In summary, the units that have the highest relative time spent being stalled are identified. Then, the particular condition(s) within the unit(s) that are causing its stalls are identified. Next, a determination of potential improvement may be estimated by making appropriate changes, such as increasing the number of rename buffers. Conversely, it may be determined that there are always some rename buffers available and therefore the number of rename buffers may be reduced. Also compiler changes may be appropriately identified. In addition, a section of software code can be altered based on the counted number of dispatch unit stalls to reduce the number of stalls. Conversely, a hardware element of the processor system can be altered based on the counted number of dispatch unit stalls to reduce the number of stalls.

Performance Monitoring of the Effect of Memory Accesses on a Processor System

The performance of memory access operations, especially when they miss the first level cache, becomes an important consideration since computer systems are forced to use hierarchical memory sub-systems due to the cost sensitivity of the systems. It is the case that no memory hierarchy will achieve the ideal performance; this ideal being that all memory locations be accessed as promptly as general purpose registers.

The key concept of a hierarchical memory system is that most often memory accesses will be immediately satisfied by first level cache accesses. Expectedly, there will be infrequent but costly first level cache misses. It is desirable that the processor be able to execute efficiently in the presence of first level cache misses. Therefore in a processor, one design objective is to utilize the memory hierarchy in as efficient a manner as possible.

One method of efficiently utilizing hierarchical memory systems is to implement out of order execution to allow instructions in the vicinity of instructions incurring first level cache misses the opportunity to execute during the interval when the memory access instructions are delayed by the mentioned misses.

One of the completion unit's main tasks is to reorder in an architecturally valid manner the instructions that are executed out of order. One of the main obstacles to executing instructions out of order is the serialization due to architectural dependencies that is caused by cache misses. So an understanding of the time required to service a cache miss is needed.

Because a superscalar processor may have instruction level parallelism, it is not enough to simply know that there is a first level cache miss because it may not be causing any delays in the completion of the other instructions. The critical knowledge is actually the effect that the first level cache miss has on the completion of instructions; especially when it delays the completion of instructions. The very nature of out of order execution causes this to be difficult to ascertain.

The completion unit completes instructions (potentially more than one per cycle) according to their age (oldest first). It is clear that the completion unit can not advance beyond an unfinished memory access or an instruction dependent on an unfinished memory access. It is such obstructions that cause visible performance losses since the software must execute in the architecturally specified order.

Rather than examining the time required to service a cache miss, the time that completion is stalled due to a cache miss is examined. Thus, this limits the need for examination to the oldest instruction in the completion buffer.

The preferred embodiment will not only gain knowledge of the delays experienced by the completion unit due to memory accesses, but also evaluate other factors that affect the performance of the load/store unit. These may include: counting the cycles and times the load and store queues are full, counting the number of times there are address collisions between loads and stores, counting the time to service Load/Store instructions, counting the number of cycles and times the load/store unit was stalled due to the memory management unit being busy, and similar such circumstances.

It is the ability to characterize the actual effect of memory latency on execution progress that causes this technique to be important. This technique recognizes that lengthy service times for load/store/ifetch misses are not by themselves the problem that must be examined by system architects. The technique recognizes the need to understand the effect of delays on the completion of out-of-order execution and properly measures only those cycles that are lost due to tardy completions. Once the specific problems that stall completion are identified and their relative importance ascertain, the data may be used to make compiler changes, software changes, and/or hardware design changes.

Performance Monitoring of Dispatch Unit Efficiency

In an alternate embodiment, the efficiency of the dispatch unit can also be monitored using the performance monitoring facility. In addition to the counting of the number of instruction dispatched per cycle, a more particular measurement of dispatch unit efficiency is readily achieved through tailoring of the count mechanism. Preferably, the PMCn are used to count the number of times a predetermined number of instructions are dispatched per cycle. Suitably, the number of times no dispatches occur can be counted, the number of times one (1) instruction is dispatched per cycle can be counted, the number of times two instructions are dispatched per cycle is counted, and so on up to the number of times "n" instruction are dispatched per cycle, where "n" is the maximum number of instructions that the processor can handle per cycle.

In this manner, system designers know not only an average dispatch rate which a count of the number of dispatches over a particular number of cycles would produce, but also an actual record of cycles having a particular number of instructions dispatched per cycle. Thus, a system that can handle a greater number of dispatches per cycle than the number actually occurring can be modified to make use of their full abilities, for example, by making compiler changes. Likewise, those systems consistently dispatching at the maximum number can be altered to increase their dispatch capabilities to enhance performance. If the number of dispatches per cycle are consistently less than the maximum supported, then reducing the maximum number of dispatches allowable per cycle would be appropriate. If the critical timing path is through this logic then eliminating this logic would improve performance by increasing the clocking speed. In this last case, another benefit would be to reduce die area.

Performance Monitoring of Idles

Another situation affecting efficiency is the occurrence of idle units in the processor. As before mentioned, for purposes of this discussion, an idle condition refers to an execution element having nothing to do, as opposed to an operating system "having nothing to do" which is often implemented by a branch to self waiting for an interrupt to occur. Utilizing the performance monitoring facility and designated bits of a machine status save/restore register (SRR1), a history of idles is suitably formed. As described above, when the performance monitoring interrupt is taken, the captured SIA, SDA, and machine state data at the time of the signalling of the interrupt is available to the software. In the preferred embodiment, the hardware copies the information in SSR to the designated bits of the SRR1, e.g., bits 1–4 and 10–15, the conditions of these bits at the time the interrupt is taken reflect the idle status of the execution elements at the time the interrupt was signalled.

By way of example, in a preferred embodiment, bit 2 of the SRR1 represents the floating point unit, bit 3 represents the branch unit, bit 4 represents a simple fixed unit, bit 10 represents another fixed unit, bit 11 represents the complex fixed unit, bit 12 represents the load/store unit, bit 13 represents the dispatch unit, and bit 14 represents the completion unit. A low logic level for a bit suitably indicates the unit associated with that bit is busy at the time of the signalling of the interrupt. Conversely, a high logic level for a bit suitably indicates the associated unit is idle at the time the interrupt is signalled.

With the captured instruction data as well as the state of idles in the execution unit at the time of the exception provided by the bit data in the SRR1, alterations to improve software code may be made to eliminate or reduce the idle conditions and fully utilize the processor. For example, the ordering of the code could be changed to allow some portion of the code to utilize an idle unit, such as an intermixing of instructions, if appropriate, to utilize units concurrently, etc.

Performance Monitoring of misaligned Memory Accesses

Another situation that may cause processor performance inefficiencies are memory accesses to misaligned data. For example, when running software code that was designed for one type of computer such as an 8 bit computer on a different type of computer, such as a 32 bit computer, misaligned data may require a significant-period of time to process. For the purposes of this application, a memory operand is said to be aligned if it is aligned at its natural boundary, otherwise the operand is misaligned. It is important to be able to effectively monitor the misaligned memory accesses to improve the efficiency of the processor.

Accordingly, there exists a need for a system and method for effectively monitoring processor system performance that will efficiently and non-invasively identify potential areas for improvement. Particularly, memory utilizations require monitoring, including identifying the processing overhead related to misaligned data. Again, the performance monitoring facility is preferably utilized to monitor such situations. Configuring the PMCn with the MMCRn, a count of a number of misaligned store operations can be achieved. Further, a count of the number of misaligned stores that are cache hits for both first and second accesses is also achievable. Similarly, a count of the number of misaligned load operations and correspondingly a count of the number of misaligned load operations that are cache hits for first and second accesses also is achievable. Such counts provide data useful in identifying system performance degradation for misaligned data accesses. A further count of a number of cycles misaligned stores and misaligned loads take provides additional important data.

Using these counts, an estimate of the loss of efficiency is determined. A potential performance penalty for each monitored portion of the code is identified by determining the cost of misaligned load operations (CULD) across the number of misaligned loads and the cost of misaligned store operations (CUST) across the number of misaligned stores. Preferably, CUST represents the number of cycles due to an misaligned store less the number of cycles due to an aligned store, while CULD represents the number of cycles due to an misaligned load less the number of cycles due to an aligned load.

By knowing the performance penalty being paid during execution of the monitored code, an estimate of the improvements and changes to that code can be made to determine if reducing the number of misaligned loads and stores being performed is worth the effort. Further, depending upon system needs, hardware element changes could be made to minimize the amount of time spent on misaligned accesses. Also, by knowing the potential performance degradation due to misaligned accesses, considerations can made to change the alignment conditions.

Performance Monitoring Of serialization Instructions

The PowerPC architecture provides for out of order execution of instructions, a relatively new phenomenon for microprocessors. This allows the processor to avoid waiting for the completion of a cache miss by executing instructions out of sequence. The operating system must be cognizant of out of sequence execution side effects, such as, addressability changes and must occasionally force a context synchronization before other instructions are executed. For example, the software must have an isync after a move to machine state register (mtmsr) when new addressability is required. A common software error is to miss inserting an isync, where it is required. This type of software error is difficult to find because it shows up as a platform dependent timing (not necessarily repeatable) error. Analyzing the number of mtmsrs and the cost can be used as a means to determine whether the instruction set architecture should be changed to automatically make the mtmsr a synchronizing instruction. These context synchronizing instructions typically cause performance degradations because of the draining of the pipeline.

Utilizing the performance monitoring facility, occurrences of instructions known to cause serialization of the processor can be monitored. For example, in the PowerPC instruction set architecture, instructions such as sc (system call), sync (synchronize), isync (instruction synchronization, rfi (return from interrupt), mtbat (move to block address translation), mtsr (move to segment register), and eieio (enforce in-order execution of input/output) instructions force a serialization of the pipeline. By counting the number of sc instructions completed, the number of sync instructions completed, and/or the number of eieio instructions completed, the number of isync instructions completed, the number of rfi instructions completed, as well as the number of additional cycles needed to force the serialization, determinations can be made as to the impact on processor performance.

For example, the sync instruction provides an ordering function for the effects of all instructions executed by a given processor. Executing a sync instruction ensures that all instructions previously initiated by the given processor appear to have completed before any subsequent instructions are initiated by the given processor. When the sync instruction completes, all external accesses initiated by the given processor prior to the sync will have been performed with respect to all other mechanisms that access memory. Thus, the execution of a sync instruction may go out on the bus and allow memory accesses to be completed, which can affect performance in other processors of a multiprocessor system. Similarly, the eieio instruction, which provides an ordinary function for the effect of load and store instructions executed by a given processor and ensures that all memory accesses are sequentially initiated, also may go out on the bus and can also affect performance across multiple processors. Monitoring of these two instructions can therefore help establish degradation in performance of one processor and across multiprocessors in a system.

Additionally, other items that cause serialization but that could be changed to avoid serialization include exceptions. Thus, the number of exceptions is also suitably counted to determine portions of code causing system performance degradation through serialization of the processor's pipeline. The method and system also allows for counting the number of instructions that often require a synchronizing instruction to follow it, for example, many uses of the mtmsr, require the next instruction to be an isync in order to force the new context to be in effect. Use of the "history" mode in sampling can be used to determine the relative frequency that this occurs. Collection of this data can be used to make architecture changes as well as machine changes or software changes as a result of the analysis of the data.

Performance Monitoring of Efficiency of Branch Unit Operation

Another aspect of processing that can be monitored to determine performance is the branch unit operation. Branch prediction is a large part of branch unit operation. An example of logic control for branch unit operation is provided in co-pending U.S. patent application Ser. No. 08/497,001 entitled "Processing System and Method of Operation" assigned to assignee of the present invention and incorporated herein by reference in its entirety. By tracking the counts of the number of basic blocks in execution and the cancellation of basic blocks, one may begin evaluating the effectiveness of the prediction logic. In the context of the present application a basic block is defined as a sequence of instructions that begins with a conditional branch instruction and ends previous to the next conditional branch instruction.

Of course, because of the many paths conditional branching may follow, determinations on a best course of action for improvements are system and situation dependent. For the PowerPC architecture, the type of counts suitable for use in this evaluation includes a count of the number of: instructions dispatched along the branch target path; instructions dispatched sequentially (along the branch target not taken path); basic blocks prefetched; basic blocks incorrectly prefetched; cycles the branch processing unit is idle; cycles the branch unit produces a result or is stalled; branches completed; instructions dispatched to the branch processing unit; accesses to a branch target address cache (BTAC); fetch corrections made at the dispatch stage or at the decode stage; times the condition register (CR) logical unit produced a result; hits or misses in the BTAC; and times all basic block identifiers were used. All of these determinations are utilized to analyze branches to determine the branch unit operation.

Additionally, the method includes altering the code to reduce the possibility of misprediction based on the accumulated count data. For example, the code can now be written to more effectively operate within the processor. If a processor implements a branch prediction mechanism that will always predict a conditional branch not to be taken, any code that uses many loops will perform poorly. The loop code can be modified by changing the conditional branch at the end of the loop to an unconditional branch. Before the unconditional branch the code would have a conditional branch that would skip over the unconditional branch. Thus, the loop will now be predicted correctly except for the last iteration through the loop.

Additionally, the present invention can improve compilation strategies by studying the performance characteristics of branch handling, including improving basic block movement by commercially available programs such as Heat Shrink (manufactured by IBM). Further, since the data gathered in accordance with the present invention occurs during real-time system processing, system designers have improved ability to more accurately determine specific deficiencies in system performance and develop system improvements to overcome those deficiencies. Thus, for example, the Heat Shrink program could move basic blocks dynamically thereby tuning the system performance as a result of the data collected.

Performance Monitoring of Time Lengths of Disabled Interrupts

In a further aspect of processor performance, interrupt handlers are performance critical sections of code. Typically, at the start of an interrupt handler routine, exceptions are ignored. Of particular interest are interrupt handlers which inhibit interrupts in a processor system. When interrupts are inhibited too long, obtaining accurate and unbiased profiling of the system or servicing other critical interrupts is difficult. In addition, while interrupts are inhibited, other interrupts can not be processed which may cause overrun or underrun on a device, such as a tape device. Thus, a further need exists to monitor the amount of time interrupts are inhibited. Thus, by counting the number of cycles and occurrences that exceptions are ignored, and comparing that to the total number of cycles and occurrences during the sampling period, the impact of interrupt handlers on the system performance is determined.

Preferably, the performance monitoring facility is utilized to count the number of cycles and occurrences that exceptions are ignored. In the PowerPC architecture, for example, the enable exception (EE) bit of the MSR is set low to have exceptions ignored. Thus, a count of the number of cycles the EE bit is low would be suitable. Alternatively, having the performance monitoring facility provide a count of the number of cycles exceptions are ignored and that an interrupt is pending also provides system performance data. Furthermore, having the performance monitoring facility count the number of occurrences exception are ignored and an interrupt is pending also provides system performance data.

With the present invention, improved performance in a processor system is obtainable through identification of how long interrupts are held off and the identification of those areas of code which result in the longest lockouts. The present invention provides means to identify and therefore reduce the impact of disablement, which is especially significant in a multiprocessor system where one processor may be waiting for a resource held by another processor. Further, since the data gathered in accordance with the present invention occurs during real-time system processing, system designers have improved ability to more accurately determine specific deficiencies in system performance and develop system improvements to overcome those deficiencies.

Performance Monitoring of the Time Lengths of Instruction Execution

In a further examination, the time spent by the processor to execute an instruction indicates system performance efficiency. More particularly, utilizing the performance monitoring facility, counts of the number of instructions entering or exiting per cycle and the number of instructions either entering or leaving the processing system are readily determined. For example, the time required to execute load or store instructions provides valuable system performance data.

Using these counts and the principles of Little's Law, a determination of the average processing time of an instruction is achieved. According to Little's Law, the average time a customer spends in a system equals the average number of customers in the system divided by the average rate that a customer enters or leaves the system. Applying that to the processor system, the average time required to process an instruction, e.g., a load or store, equals the average number of instructions held in the instruction queue divided by the average number of instructions entering the instruction queue. Thus, the counts of the number of instructions and the number of instructions entering the processing system provide the data that is readily used to determine the average time required to process an instruction. In one aspect, the average time is a ratio of the running sum of the number of members for each cycle in the instruction queue to the counted number of members either entering or leaving the instruction queue. Additionally, the method includes altering at least one section of code to reduce the average time the members remain and increase the efficiency of the SP system.

In a further aspect, the instruction queue is a load queue, and the entries are load instructions. Alternatively, the instruction queue is a store queue, and the members are store instructions. In yet another aspect, the instruction queue is the reorder buffer and the members are all instructions.

Knowing the average processing time for instructions, designers develop a better understanding of the actual time spent executing instructions. Again, changes to system hardware or software elements are then suitably achieved to increase the system's performance in a manner considered most appropriate. Further, since the data gathered in accordance with the present invention occurs during real-time system processing, system designers have improved ability to more accurately determine specific deficiencies in system performance and develop system improvements to overcome those deficiencies.

Although the present invention has been described in accordance with the embodiments shown, one of ordinary skill in the art will recognize that there could be variations to the embodiment and those variations would be within the spirit and scope of the present invention. For example, the control of utilizing the PM facility may be suitably provided through processes stored in a suitable computer readable storage medium, such as a floppy disk or the like.

Further although only two MMCRs have been specifically described, additional MMCRs could be utilized to provide other monitoring functions. For example, the functionality of using the SRR1 as described with reference to monitoring idles in various execution elements could be extended with the use of a third MMCR (e.g., MMCR2) to provide a selection mechanism to produce a statistical value of the machine status. A desired number of bits, e.g., 3, could be used as selection identification to designate whether idles, stalls in units, etc., are being monitored, while the SRR1 bits would then each reflect a particular execution element associated with the designated condition being monitored. For example, in MMCR2, bit 0 on could indicate stalls in all units; bit 1 on could indicate stalls within the completion unit; bit 2 on could indicate stalls within the dispatch unit, etc. In the case of completion unit stalls, bit 1 within SRR1 could indicate an unfinished floating point instruction was the cause of a stall, and bit 2 could indicate an unfinished memory access. A sampling of the status of the machine at an instant is achieved which, over a period of time, provides a characterization of system utilization. Similar to the history mode described herein, but more particular to one instance, a third MMCR would provide even greater opportunity and flexibility to selectively monitor system performance.

In addition, all of these performance monitoring techniques can be implemented in a software or hardware or any combination thereof and there use would be within the spirit and scope of the present invention. More specifically it is well understood that a circuit, combination of circuits, or any type of computer readable medium could perform these techniques and there use would be within the spirit and scope of the present invention.

Accordingly, many modifications may be made by one of ordinary skill without departing from the spirit and scope of the present invention, the scope of which is defined by the following claims.

What is claimed is:

1. A method for providing a match on a selected event in performance monitoring of a processing system, the processing system including at least one performance monitor counter (PMC), the method comprising the steps of:
   (a) initializing the at least one PMC; and
   (b) controlling counting in the at least one PMC based upon the nth occurrence of a match to a specified address, where n is greater or equal to one, the match being based upon the specified address being associated with a specific process identified by a bit in a machine state register.

2. A method for eliminating false triggering in performance monitoring of a processing system, the processing system including at least one performance monitor counter (PMC), and at least one monitor mode control register (MMCR) to configure the operations of the at least one PMC, the method comprising:
   controlling counting in the at least one PMC through at least one bit of a first MMCR;
   determining whether the at least one bit is at a first logic level;
   determining a logic level for at least one bit of a machine state register;
      determining logic levels for a bit set of a second MMCR; and
   disabling counting until a selected match event occurs when the at least one bit of the first MMCR is at the first logic level.

3. The method of claim 2 wherein the first logic level comprises a high logic level.

4. The method of claim 2 wherein when the selected match event occurs, the one bit is placed at a second logic level opposite the first logic level and counting is enabled.

5. The method of claim 2 wherein the selected match event is an enabled IABR signal.

6. The method of claim 2 wherein the bit set comprises four low-order bits of the second MMCR.

7. The method of claim 2 wherein the at least one bit of the machine state register comprises a performance monitor bit to mark a specific process for counting.

8. The method of claim 7 wherein the at least one bit further comprises a privilege bit.

9. A method for allowing user selectable support to control performance monitoring of a selected event in a processing system, the processing system including at least one performance monitor counter (PMC), and a plurality of monitor mode control registers (MMCRs) to configure the operations of the at least the PMC, the method comprising:
   (a) establishing a set of logic conditions for controlling performance monitoring of the processing system, the set of logic conditions including a chosen logic level for a performance monitor bit of a machine state register to mark a specific process for counting;
   (b) setting a bit of the at least one MMCR to a first level when the set of logic conditions is at a first logic state to engage performance monitoring; and
   (c) disengaging performance monitoring when a predetermined number of events has occurred.

10. The method of claim 9 wherein the first logic level is a low logic level.

11. The method of claim 9 wherein the set of logic conditions further comprises a bit set of one of the plurality of MMCRs and a privilege bit of the machine state register.

12. The method of claim 11 wherein the first logic state has the bit set of the at least one MMCR at low logic levels.

13. A system for eliminating false triggering in performance monitoring of a processing system, the processing system including at least one performance monitor counter (PMC), and at least one monitor mode control register (MMCR) to configure the operations of the at least one PMC, the system comprising a circuit for controlling counting in the at least one PMC through at least one bit of a first MMCR; for determining whether the at least one bit is at a first logic level; for determining a logic level for at least one bit of a machine state register; for determining logic levels for a bit set of a second MMCR; and for disabling counting until a selected match event occurs when the at least one bit of the first MMCR is at the first logic level.

14. The system of claim 13 wherein the first logic level comprises a high logic level.

15. The system of claim 13 wherein when the selected match event occurs, the one bit is placed at a second logic level opposite the first logic level and counting is enabled.

16. The system of claim 13 wherein the selected match event is an enabled IABR signal.

17. The system of claim 13 wherein the bit set comprises four low-order bits of the second MMCR.

18. The system of claim 17 wherein the at least one bit of the machine state register comprises a performance monitor bit to mark a specific process for counting.

19. The system of claim 18 wherein the at least one bit further comprises a privilege bit.

20. A system for allowing user selectable support to control performance monitoring of a selected event in a processing system, the processing system including at least one performance monitor counter (PMC), and at least one monitor mode control register (MMCR) to configure the operations of at least one of the PMCs, the system comprising a circuit for establishing a set of logic conditions; for controlling performance monitoring of the processing system, the set of logic conditions including a chosen logic level for a performance monitor bit of a machine state register to mark a specific process for counting; for setting a bit of the at least one MMCR to a first level when the set of logic conditions is at a first logic state to engage performance monitoring; and for disengaging performance monitoring when a predetermined number of events has occurred.

21. The system of claim 20 wherein the first logic level is a low logic level.

22. The system of claim 20 wherein the set of logic conditions further comprises a bit set of one of a plurality of MMCRs and a privilege bit of the machine state register.

23. The system of claim 22 wherein the first logic state has the bit set of the at least one MMCR at low logic levels.

24. A system for providing a match on a selected event in performance monitoring of a processing system, the processing system including at least one performance monitor counter (PMC), the system comprising a circuit for controlling counting in the at least one PMC based upon the selected event being associated with a specific process; and for triggering counting when the selected event is matched based upon a logic level of a bit within a machine state register within the processing system.

25. A system for providing a match of an effective address in performance monitoring of a processing system, the processing system including at least one performance monitor counter (PMC), the system comprising a circuit for controlling counting in the at least one PMC based upon the effective address being associated with a specific process; and for triggering counting when the effective address is matched based upon a logic level of a bit within a machine state register within the processing system.

26. A computer readable medium including program instructions for implementing a method of eliminating false triggering in performance monitoring of processing system, the processing system including at least one performance monitor counter (PMC) and at least one monitor mode control register (MMCR) to configure the operations of at least one of the PMCs, the program instructions comprising:

controlling counting in at least one PMC through at least one bit of a first MMCR;

determining whether the at least one bit is at a first logic level;

determining a logic level for at least one bit of a machine state register;

determining logic levels for a bit set of a second MMCR; and disabling counting until a selected match event occurs when the at least one bit of the first MMCR is at the first logic level.

27. A computer readable medium including program instructions for providing a match on a selected event in performance monitoring of a processing system, the processing system including at least one performance monitor counter (PMC), the program instructions comprising:

(a) controlling counting in the at least one PMC based upon the selected event being associated with a specific process; and (b) triggering counting when the selected event is matched based upon a logic level of a bit within a machine state register within the processing system.

28. A computer readable medium including program instructions for providing a match of an effective address in performance monitoring of a processing system, the processing system including at least one performance monitor counter (PMC), the program instructions comprising:

(a) controlling counting in the at least one PMC based upon the effective address being associated with a specific process; and (b) triggering counting when the effective address is matched based upon a logic level of a bit within a machine state register within the processing system.

* * * * *